United States Patent [19]

Kennedy, Jr.

[11] Patent Number: 4,637,641

[45] Date of Patent: Jan. 20, 1987

[54] ASSEMBLY MEANS FOR STANDARDIZED MECHANICAL JOINT FOR PIPELINE APPURTENANCES

[76] Inventor: Harold Kennedy, Jr., 18 Fox Hollow, Eastland, Tex. 76448

[21] Appl. No.: 741,680

[22] Filed: Jun. 5, 1985

[51] Int. Cl.[4] ............................................. F16L 19/00
[52] U.S. Cl. .................... 285/337; 285/363; 285/368; 285/405; 285/412; 251/148; 411/116; 411/427
[58] Field of Search ............... 411/427, 537, 538, 116, 411/119, 166; 251/148, 329; 285/337, 413, 363, 368, 405, 412, 414, 415, 416

[56] References Cited

U.S. PATENT DOCUMENTS

| 469,613 | 2/1892 | Vinyard ........................ 411/116 X |
|---|---|---|
| 1,365,530 | 1/1921 | Moore . |
| 1,556,745 | 10/1925 | Banta . |
| 1,873,620 | 8/1932 | Moore . |
| 1,873,621 | 8/1932 | Moore . |
| 1,960,750 | 5/1934 | Moore . |
| 2,282,738 | 6/1942 | Moore . |
| 2,868,576 | 1/1959 | Boughton ........................ 285/337 X |
| 3,095,672 | 7/1963 | DiTullio et al. ................ 411/116 X |
| 3,141,686 | 7/1964 | Smith et al. .................... 285/413 X |
| 3,144,261 | 8/1964 | Stephens ........................ 285/363 X |
| 3,700,270 | 10/1972 | Howard ........................ 285/337 |
| 4,071,265 | 1/1978 | Wallace . |

FOREIGN PATENT DOCUMENTS

| 814289 | 6/1969 | Canada ................................. 285/337 |
|---|---|---|
| 1320730 | 6/1973 | United Kingdom ................ 285/363 |

*Primary Examiner*—Richard J. Scanlan, Jr.
*Assistant Examiner*—Joseph A. Fischetti

[57] ABSTRACT

An assembly means for the standardized mechanical joint when used on pipeline appurtenances such as gate valves, fittings, etc., wherein the design or dimensions of said appurtenances prevent the insertion of the standardized T-bolt in one or more bolt holes. An improved fastener is inserted and tightened from the gland side facilitating the rapid assembly of said joint. Said improved fastener eliminates the need for slots on gate valves, fittings and the like, and prevents failure of the cast-iron valve body during compression of the gasket.

8 Claims, 7 Drawing Figures

PRIOR ART
FIG. 1
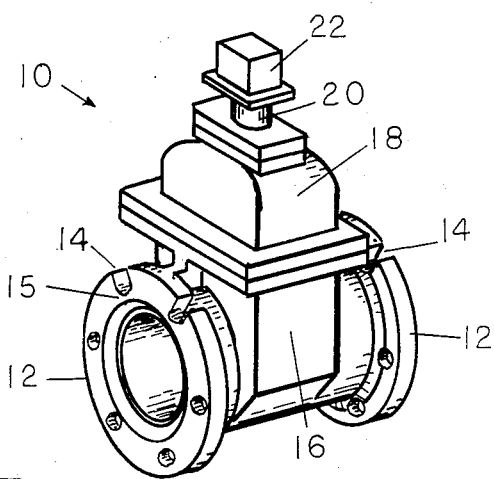
PRIOR ART
FIG. 2
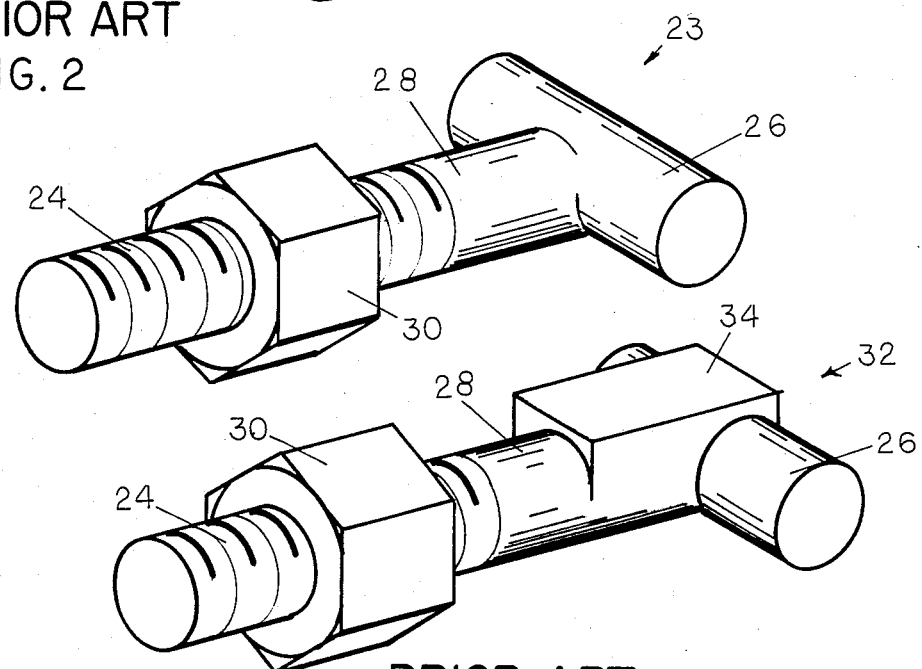
PRIOR ART
FIG. 3

ASSEMBLY MEANS FOR STANDARDIZED MECHANICAL JOINT FOR PIPELINE APPURTENANCES

BACKGROUND OF THE INVENTION

This invention relates to a new and useful improvement in the mechanical joint for pipe, particularly when conforming to the standardized dimensions in ANSI/AWWA C111/A21.11, American National Standard for Rubber-Gasketed Joints for Ductile-Iron and Gray-Iron Pipe and Fittings, and used on pipeline appurtenances such as gate valves and fittings.

The joint in question and improvements thereto has been the subject of many U.S. patents, among them: U.S. Pat. Nos. 1,365,530; 1,556,745; 1,873,620; 1,873,621; 1,960,750; 2,282,738 and others. The joint has received wide acceptance and now has its dimensions standardized. This invention involves improvements to the standardized mechanical joint mentioned above. Throughout this patent the words "standardized mechanical joint, standardized T-bolt, or standardized nut" will refer to the standardized dimensions, description, and method of assembly shown in the abovementioned standard and its appendices. Use of the standardized mechanical joint and some alternate dimensions are also found in the following standards: ANSI/AWWA C110/A21.10 American National Standard for Gray-Iron and Ductile-Iron Fittings, 3 In. through 48 In. for Water or Other Liquids; ANSI/AWWA C153/A21.53, American National Standard for Ductile-Iron Compact Fittings, 3 In. through 12 In. for Water or Other Liquids; AWWA C500, AWWA Standard for Gate valves 3 In. through 48 In. for Water and Other Liquids; AWWA C509, AWWA Standard for Resilient Seated Gate Valves 3 In. through 12 In. for Water or Other Liquids. With some few exceptions, the same dimensions are listed or refered to in all these standards. The word "standardized" used in conjunction with an item is not to exclude the use of that item found in any of the abovementioned standards or any use wherein ANSI/AWWA C111/A21.11 is referenced.

The standardized mechanical joint has been included in the waterworks specification of the majority of cities and towns in the United States. Although the joint was designed for pipe and fittings it has become the most widely used joint on waterworks valves. The problem which this invention addresses arises for the most part from the prior art use of the standardized mechanical joint on gate valves. In the size range 3" through 12" gate valves require one or more slots instead of bolt holes due to the inability to insert the required standardized T-bolt. This is caused by the valve body casting surface being too close to the standardized bell flange.

Therefore, it is the object of this invention to provide an improved means of assembly of the standardized mechanical joint on pipeline appurtenances having shape or dimensions which prevent the insertion of the standardized T-bolt, particularly on gate valves and compact fittings as found in ANSI/AWWA C153/A21.53.

The ordinary prior art method of assembly is to:
a. Place the gland on the pipe or fitting spigot.
b. Place the gasket on said spigot in front of gland.
c. Insert said spigot into the standardized mechanical joint socket.
d. Push said gland and gasket forward.
e. Align the gland bolt holes with the bell flange bolt holes and extend the T-bolts through the bell flange and gland bolt holes in that order.
f. Connect the standardized nut to the threaded end of the T-bolt.
g. Tighten each nut to the torque required to prevent leakage.

The standardized nut is a heavy hex nut. Because of the added height of the heavy hex nut, a ratchet type socket wrench is very stable during tightening and the standardized nuts can be torqued with one hand.

In the case of assembly of the standardized mechanical joint when said joint is a part of a gate valve conforming to AWWA C500, standardized T-bolts are inserted as described above except for the two bolts closest to the vertical centerline of the valve. Because of the close fit, the two bolt holes closest to the vertical centerline are replaced with slots. The standardized T-bolt is placed in the slot and tightened by torquing the nut. In most cases the standardized T-bolt will not stay in place while tightening. Valves are therefore provided with special T-bolts having a side lug to prevent the bolt from turning during tightening. It often occurs that during tightening the thin section of valve body below the slot will fail by cracking. This is catastrophic since leakage occurs and usually the entire valve is replaced.

SUMMARY OF THE INVENTION

Accordingly, it is the primary object of this invention to provide a novel combination of threaded fastener and nut means which when used in combination with valves and compact fittings eliminates the need for slots.

Another object of this invention is to facilitate the rapid assembly of the standardized mechanical joint. The threaded fastener which is part of this invention will hereinafter be called a screw since it will be tightened by torquing the head. Said screw is provided with a special nutlike head to facilitate the assembly of the standardized mechanical joint. The ordinary wrenching means used is a ratchet wrench with a deep socket. The height of the standardized heavy hex nut is for example, on a ¾" bolt, ⅞". Whereas the height of a ¾" heavy hex bolt head is only 178 ". The added height of the heavy hex nut greatly facilitates the rapid assembly of the mechanical joint by stablizing the wrench socket on the nut to such an extent that the wrench can be used with one hand. The wrench is prone to slip off the ½" head and will not easily slip off the ⅞" nut height. During assembly the wrench is rapidly moved from nut to nut. If the ordinary ½" head height is used, and the bolts are tightened from the head, the wrench often slips and it becomes necessary to use the other hand to hold the socket in place while the head is torqued. Said screw in this invention is provided with a hex head of extra height equal to the height of the standardized heavy hex nut.

The length of said screw is such that, when the joint components are in position prior to compression of the gasket, said screw can be extended through the gland and bell flange bolt holes and engage the internal threads of the nut means. After tightening, the screw will extend no more than ½" in the preferred embodiment, which will allow for gasket compression but will not contact the valve body casting surface.

The preferred embodiment nut means is generally rectangular in shape to prevent turning during tightening and it is arcuate on the contact surface to provide linear contact with the surface of the bell flange. The surfaces adjacent to the said arcuate surface recede at approximately 30 degrees. This provides clearance to allow the screw to be axially misaligned and still function without undue bending stress. Although the preferred embodiment contact surface is arcuate, it will be understood that other shapes would perform this function.

The method of assembly provided by this invention is as follows:

a. The gland, gasket, socket, and spigot are positioned and aligned as described in the prior art.
b. Standardized T-bolts are inserted, if possible, from the valve side of the joint, extending through bell flange and gland bolt holes respectively.
c. In all cases where the standardized T-bolts cannot be inserted as described, the said special screws are inserted from the gland side, through the gland bolt hole and bell flange bolt hole respectively.
d. The screw is threadably ingaged to the nut means.
e. All standardized nuts and special screw heads are torqued to the level of torque so as to prevent leakage. This torquing operation can be accomplished by using one hand only, as is often necessary.

These together with other objects and advantages which will subsequently become apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a view of the standardized mechanical joint used on a gate valve as in the prior art having slots instead of bolt holes in the tight areas.

FIG. 2 is a perspective view of the standardized T-bolt and nut as described in ANSI/AWWA C111/A21.11, used in all bolt holes where possible.

FIG. 3 is the prior art modification of the standardized T-bolt and nut for use with slots.

DETAILED DESCRIPTION OF THE PREFERRED EMBODIMENT

Figure 4:
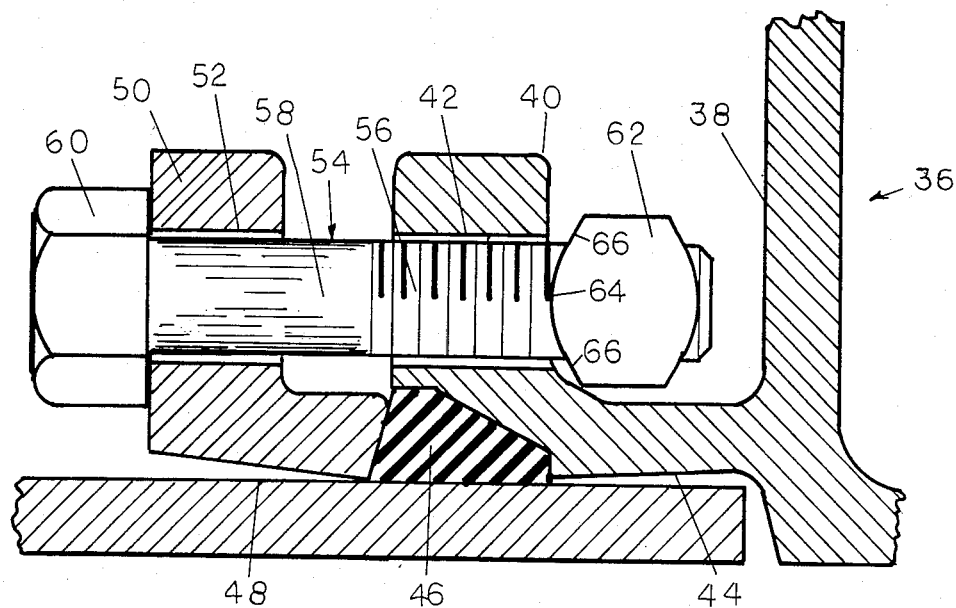
FIG. 4 is a sectional view of the portion of the standardized mechanical joint usually requiring a slot, showing the present invention.
Figure 5:
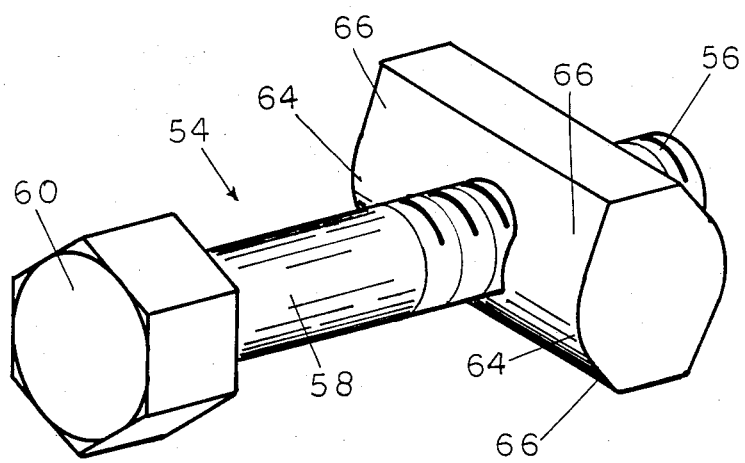
FIG. 5 is a perspective view of the preferred embodiment of the screw and nut means of the present invention.

Referring now to the drawings wherein identical reference numerals denote similar or corresponding elements throughout the various views, FIG. 1 illustrates a prior art gate valve generally designated 10 including representative prior art standardized mechanical joint ends 12. The prior standardized mechanical joint ends 12 include slots 14 to accommodate the standardized T-bolts. The prior art standardized T-bolt comforming to ANSI/AWWA C111/A21.11 is shown in FIG. 2, generally designated as 23, consisting of a threaded portion 24, a generally cylindrical T-head portion 26, an unthreaded cylindrical shank portion 28, and a standardized heavy hex nut 30. The length of bolt 23 and the length of thread 24 are both set by ANSI/AWWA C111/A21.11 and are dependent only on the size of pipe and manufacturing convenience. The actual requirement of thread length 24, is that the threads be long enough to compress the gasket. No upper limit of length of bolt 23 is required and is set for convenience only. The T-bolt 23 is tightened by applying wrenching means to the nut only, the T-bolt 23 being prevented from turning by the T-head portion 26. FIG. 3 is a prior art modification of the T-bolt 23. The standardized T-bolt 23 is not prevented from rotating when used in a slot 14. As the nut 30 is torqued, the T-bolt 23 tends to rotate and climb out of slot 14 until T-section 26 can pass through slot 14. This disadvantage is overcome in the prior art by adding a lug 34 which fits inside slot 14 thus eliminating the function of T-section 26 in preventing rotation and providing means to prevent rotation with lug 34. The addition of lug 34 only partially solves the problems caused by slot 14. The slot 14 presents an ecconomic problem in that special coring is required to cast the slot 14. Slot 14 creates a structural problem in that the metal beneath the slot 14 is very thin and is highly stressed during torquing of nut 30. This often results in the failure by cracking of the body casting 16 at the location 15 necessitating replacement of the body casting 16.

FIG. 4 is a sectional view of the portion of a valve body that would ordinarily require a slot. This area is generally designated 36. Valve body area 36 consists of body casting surface 38, standardized mechanical joint bell flange 40, bell flange bolt hole 42, standardized mechanical joint socket 44, mechanical joint gasket 46, spigot 48, standardized mechanical joint gland 50, gland bolt hole 52. The screw 54 consists of a threaded portion 56, a nonthreaded portion called a shank 58, an hexagonal head 60, said head having the same hexagonal dimensions and the same height as standardized nut 30. Said screw head height is approximately 150% of the height of an ordinary hex head bolt or screw head. This special height facilitates the use of a socket wrench with one hand and gives the screw 54 the same "feel" during tightening as nut 30. The special head 60 prevents a socket wrench from slipping off the head when used with one hand.

Nut means 62, is elongated having at least the same length as a standardized T-section 26 in the prior art and at least the same width as the across flats dimension on the standardized nut 30. The nut means 62 makes contact with bell flange 40 along a line at the apex 64 of the arcuate surface of the nut means 62. The adjacent surfaces 66 slope away from the linear contact 64 in order to allow screw 54 to be axially misaligned without adding undue stress. The length of screw 54 is critical in that it must be long enough to engage the threads of nut means 62 when the gasket 46 is uncompressed, but not so long as to interfere with the valve body casting surface 38.

Figure 6:
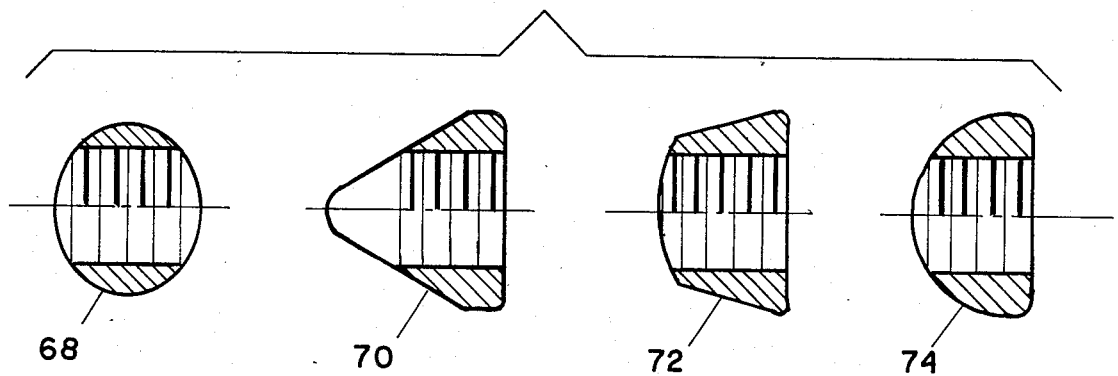
FIG. 6 is several sectional views of possible alternate embodiments of the nut means in the present invention.

FIG. 6 is cross sectional representations of alternate shapes of nut means 62 which will also perform the functions mentioned above. Nut means 62 can be shaped as an ellipse 68, generally triangular 70, trapezoidal 72, semicircular 74, or any other shape that will give linear contact and adjacent receding surfaces.

Figure 7:
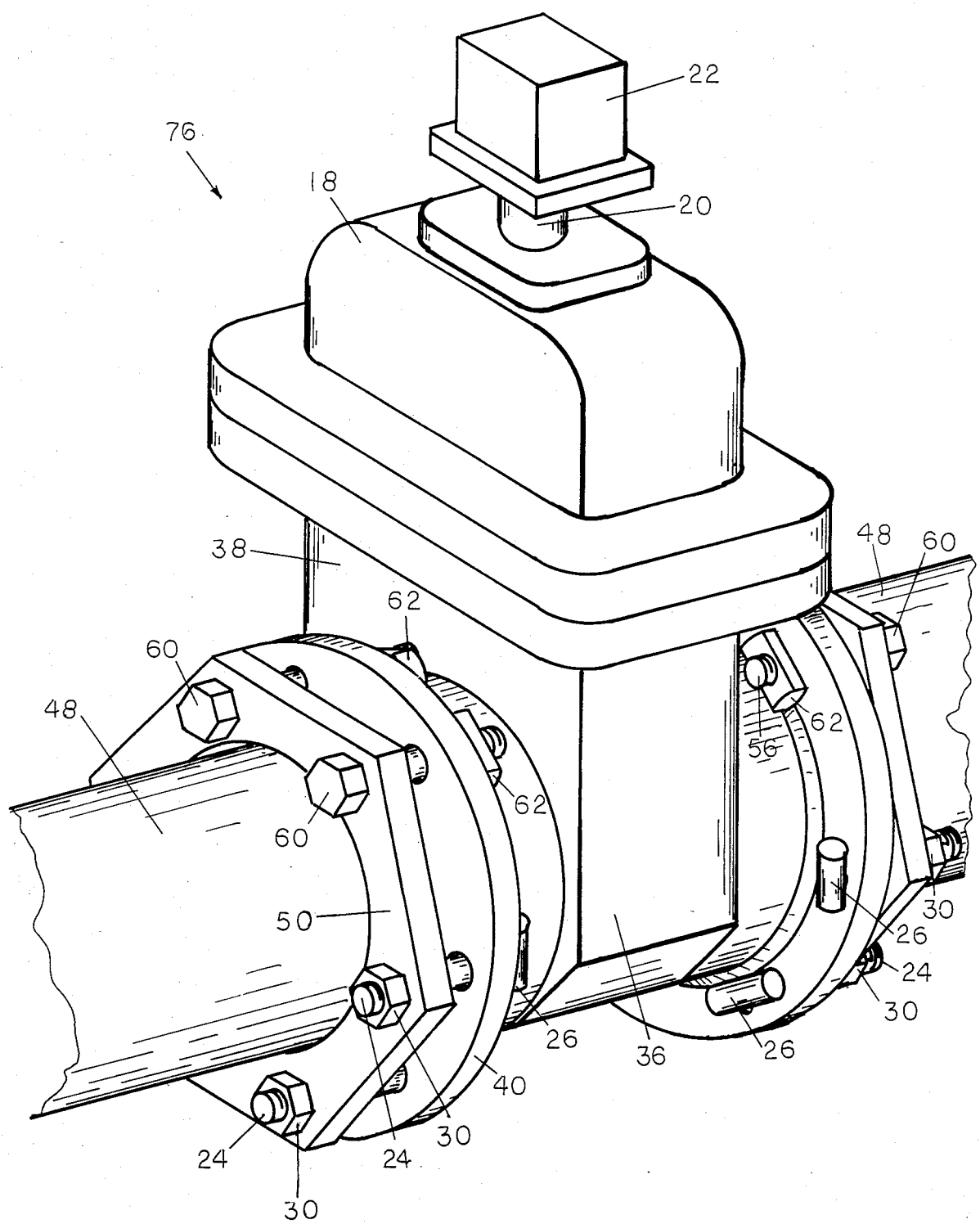
FIG. 7 is a perspective view of a valve with standardized mechanical joint ends assembled according to the method described in the present invention.

FIG. 7 is a representation of an assembled valve using the present invention as the assembly method, generally referred to as 76. The spigot 48, the gasket 46, and the gland 50 are all positioned in the conventional manner for the assembly of the standardized mechanical joint, that is, spigot 48 inserted into socket 44 having gasket 46 on spigot 48 touching socket 44 and gland 50 on spigot 48 touching gasket 46. As many standardized T-bolts 23 as possible are inserted through the bell flange bolt holes 42 first and extended through the gland bolt holes 52 having external threads 24 engaged with the internal threads of the standardized nuts 30. Screws 54 are inserted in the remaining gland bolt holes 52 first and then extended through the bell flange bolt holes 42. The screw threads 56 are engaged with the internal threads of the nut means 62. Nuts 30 and screw heads 60 are engaged by wrench means and are consecutively or alternatingly tightened until a uniform level of torque is reached so as to compress the gasket 46 and prevent leakage.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An improvement in the standardized mechanical joint connection for use on waterworks or gas pipeline appurtenances wherein the shape or dimensions of the body of said appurtenances preclude the insertion and tightening of the standardized T-bolts, said improvement comprising:
   a. a screw having an externally threaded cylindrical portion, an hexagonally shaped head on one end of said externally threaded cylindrical portion, said hexagonally shaped head having the same dimensions across flats as the standardized nuts, said externally threaded cylindrical portion having length of such dimension that engagement of said externally threaded cylindrical portion with the internal threads of nut means is provided when a gland, gasket, socket, and spigot are contiguous prior to compression of said gasket, and interference with said externally threaded cylindrical portion is prevented when said screw is tightened and said gasket is compressed,
   b. said nut means having an internally threaded elongated shape so as to prevent turning during tightening, means to provide linear contact with a standardized mechanical joint bell flange surface, said nut means having adjacent surfaces sloping away from said linear contact so as to provide for axial misalignment of said screw,
   c. whereby, as many standardized T-bolts as possible having been inserted through the bell flange bolt holes then through the gland bolt holes and threadably connected to standardized nuts, one said screw is inserted through each remaining said gland bolt hole and then through said bellflange bolt hole wherein the use of the standardized T-bolt is prevented, each said screw is threadably connected to said nut means, said screw heads and said standardized nuts being tightened from the gland side of said joint by consecutively or alternatingly connecting the same wrench means to the said hexagonally shaped heads of said screws and said standardized nuts, appling torque until said gasket is compressed and leakage is prevented.

2. The improvement to the standardized mechanical joint as described in claim 1, wherein the pipeline appurtenance containing the standardized mechanical joint is a valve.

3. The improvement to the standardized mechanical joint as described in claim 1, wherein the pipeline appurtenance containing the standardized mechanical joint is a fitting for changing the direction of the pipeline or providing a connection thereto.

4. The improvement to the standardized mechanical joint as described in claim 1, wherein the nut means has arcuate contact surfaces.

5. The improvement to the standardized mechanical joint as described in claim 1, wherein the nut means has a generally triangular cross section.

6. The improvement to the standardized mechanical joint as described in claim 1, wherein the nut means has a generally semicircular cross section.

7. The improvement to the standardized mechanical joint as described in claim 1, wherein screws having hexagonally shaped heads as described in claim 1 are used in all bolt holes.

8. The improvement to the standardized mechanical joint as described in claim 1, wherein said hexagonally shaped screw head has the same height as the standardized nut.

* * * * *